United States Patent [19]
Allendorf et al.

[11] Patent Number: 5,239,320
[45] Date of Patent: Aug. 24, 1993

[54] VENTING SYSTEM FOR EYEGLASSES

[75] Inventors: Stephan C. Allendorf, Hoboken, N.J.; Thomas M. Dair, Valley Cottage, N.Y.

[73] Assignee: Corning Incorporated, Corning, N.Y.

[21] Appl. No.: 641,050

[22] Filed: Jan. 14, 1991

Related U.S. Application Data

[63] Continuation of Ser. No. 440,079, Nov. 22, 1989, abandoned.

[51] Int. Cl.⁵ .................................... G02C 11/08
[52] U.S. Cl. .............................. 351/62; 351/47
[58] Field of Search ............... 351/51, 52, 62, 88, 351/47, 57, 138; 2/435, 436, 437

[56] References Cited

U.S. PATENT DOCUMENTS

| | | | |
|---|---|---|---|
| 3,015,987 | 1/1962 | Harrison | 2/436 |
| 3,160,735 | 12/1964 | Aufricht | 2/435 |
| 3,517,393 | 6/1970 | Beauchef | 2/436 |
| 4,317,240 | 3/1982 | Angerman et al. | 2/456 |
| 4,890,910 | 1/1990 | Gazeley | 351/47 |

FOREIGN PATENT DOCUMENTS 776139  7/1934  France ................ 351/62

Primary Examiner—Rodney B. Bovernick
Attorney, Agent, or Firm—Clinton S. Janes; Milton M. Peterson

[57] ABSTRACT

There is disclosed a venting system adapted to direct air flow over the inside of an eyeglass lens to minimize a tendency to fog. The venting system may be an integral part of a pair of eyeglasses, or may be incorporated in a separate member, in particular a shielding cassette, adapted to be used with a pair of eyeglasses.

19 Claims, 5 Drawing Sheets

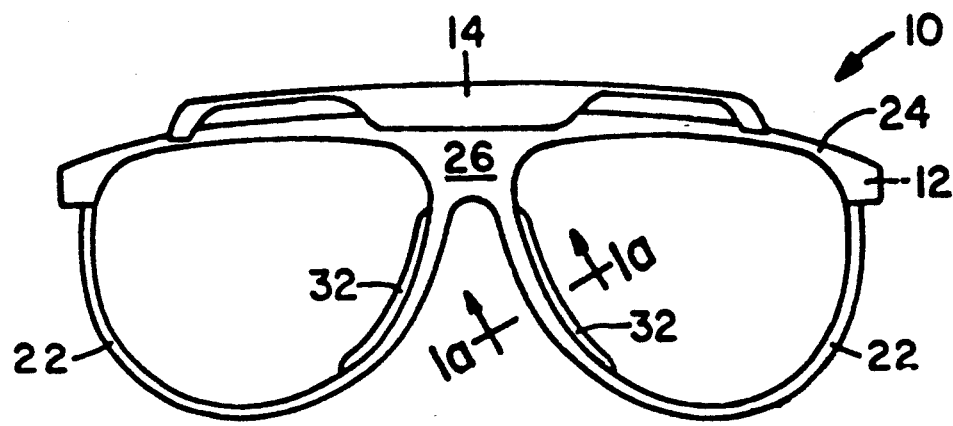
Fig. 1
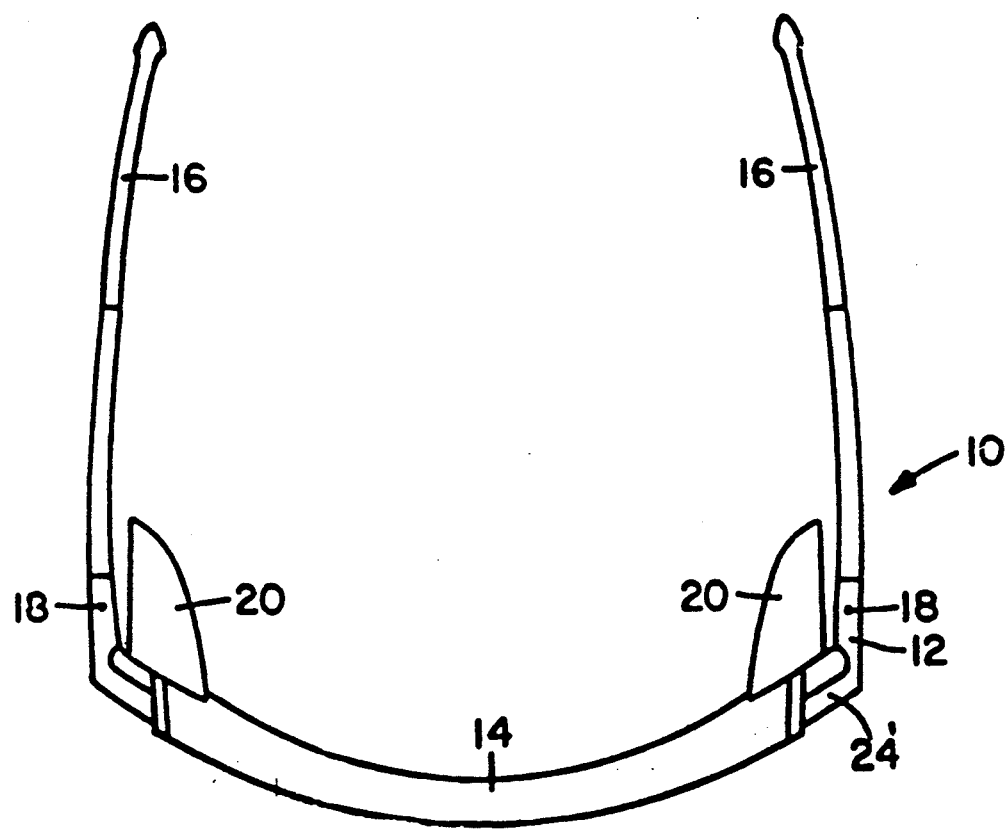
Fig. 2
Fig. 1a

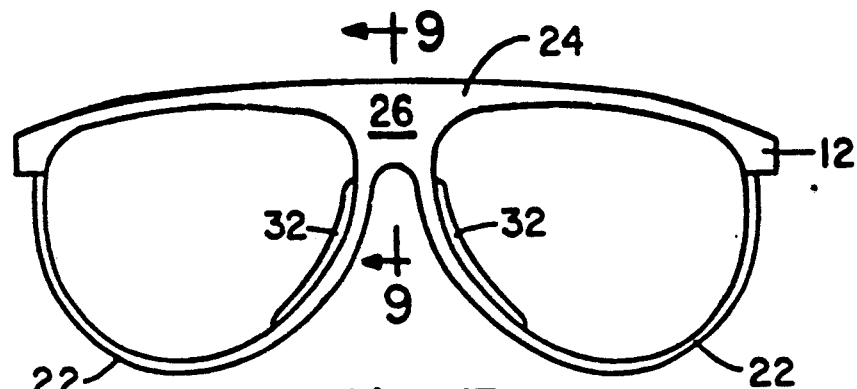
Fig. 3
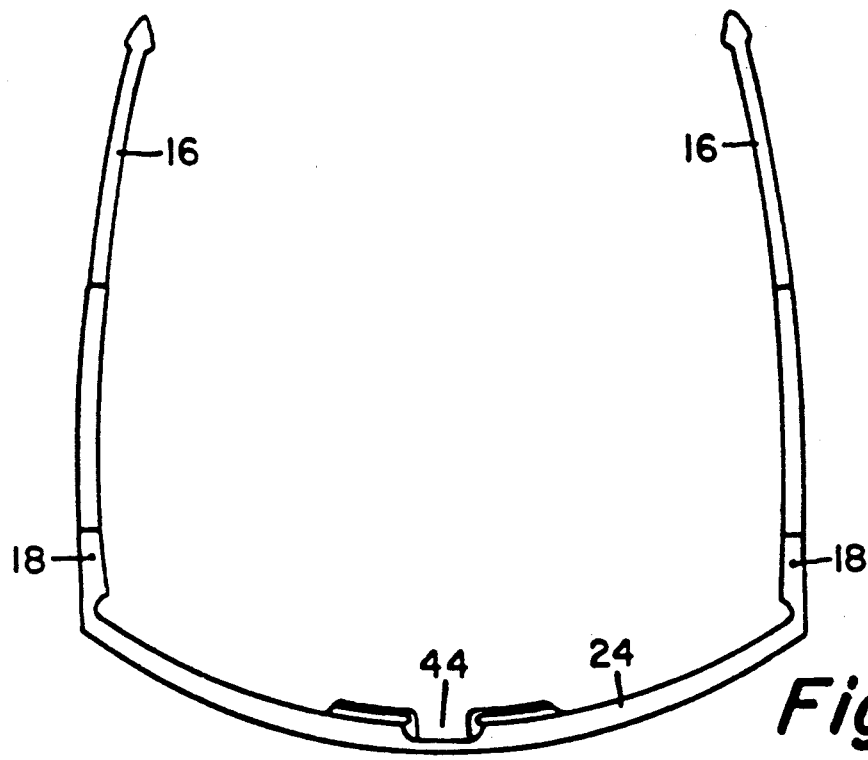
Fig. 4
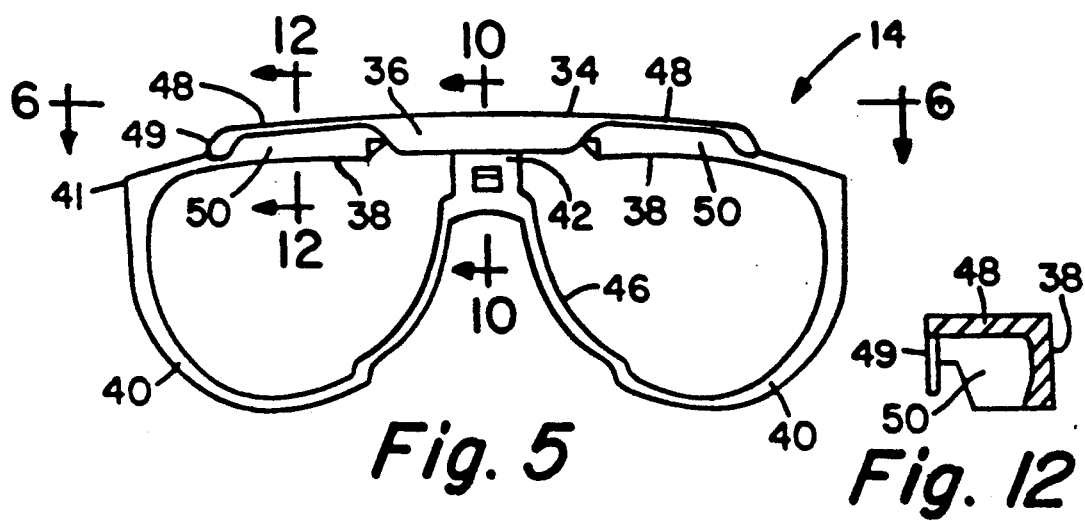
Fig. 5
Fig. 12

VENTING SYSTEM FOR EYEGLASSES

RELATED CASE

This application is a continuation of Ser. No. 440,079, filed Nov. 22, 1989, now abandoned.

Further this application is related to design patent application, Ser. No. 07/440,294 entitled "SEPARABLE EYEGLASS FRAME AND SHIELDING CASSETTE ASSEMBLY", filed on Nov. 22, 1989 in the names of Stephan C. Allendorf and Thomas M. Dair, and assigned to the same assignee as this application.

FIELD OF THE INVENTION

The invention is concerned with a venting system that may be an integral part of a pair of eyeglasses, or may be incorporated in a separate member for use with a pair of eyeglasses.

BACKGROUND

The tendency for moisture to condense on the inner surface of eyeglass lenses, often referred to as "fogging over", is a common problem. The condition may occur on any type of eyeglass. However, it is of particular concern in connection with sunglasses and goggles.

The problem may be aggravated in the case of sunglasses and goggles if special shielding against sun, glare, or wind is provided. The special shielding may take the form of side shields and/or top shields that extend rearwardly from the frame. While effective in controlling wind or glare, such shields frequently aggravate fogging by shutting off air circulation between the lens and the wearer's face.

Accordingly, numerous special venting systems have been proposed. However, these proposals have not fully resolved the problem, and, hence, have not been widely adopted.

PURPOSES

It is then a basic purpose to provide an improved venting system for use in conjunction with eyeglasses, especially sunglasses or goggles.

Another purpose is to provide a system that may be an integrated part of an eyeglass frame, or that may be incorporated in a separable member herein referred to as a cassette.

A further purpose is to provide a venting system that controls moisture condensation on an eyeglass lens.

Another purpose is to provide an improved shielding member, in the form of a cassette, for use in conjunction with eyeglasses.

A still further purpose is to provide a combination cassette and lens frame designed to releasably lock together, thus allowing the frame to be used with or without the cassette.

Still another purpose is to provide a cassette which, when assembled with an eyeglass frame, will direct air flow over the inner surface of the eyeglass lenses.

A particular purpose is to provide a combination sunglass and shielding cassette especially designed for use in skiing.

SUMMARY OF THE INVENTION

In furtherance of these and other readily apparent purposes, our invention broadly encompasses a venting system for use with eyewear, the system comprising a bar member adapted to support the system on the eyewear, the bar member being partially cut away on its underside to form at least one cavity extending to a thin back wall, each such cavity providing an air vent adjacent a lens in the eyewear and each back wall cooperating with the air vent to direct air flow over the lens. In a preferred form, our venting system comprises a horizontal bar member adapted to support the system on the browbar of the eyewear and having a central portion and two side portions extending beyond the central portion, each side portion being partially cut away to form a horizontal cavity extending to a thin back wall whereby each cavity provides an air vent above an associated lens in the eyewear and the back wall cooperates with each air vent to direct air flow downwardly over the lens.

The invention further encompasses a shielding cassette adapted to use with a pair of eyeglasses and comprising a bar member in the nature of an eyeglass frame from which depends at least one rear wall the bar having at least one cut away section extending to the rear wall, the cut away portion cooperatively acting as an air inlet when assembled with a pair of eyeglasses, the depending back wall portion behind each cut away section intercepting air flow and adapted to direct it over a lens in the eyeglasses. In a preferred embodiment of the shielding cassette, the bar member is a horizontal top shield from which two rear wall portions depend, and from which two closed, curved members in the nature of eyewires integrally depend, the bar member having two cut away sections extending to, and cooperatively acting with, the rear wall portions to direct air flow downwardly over lenses in the eyeglasses.

Another aspect of the invention is a pair of eyeglasses having a frame comprising two eyewires, each eyewire having an inwardly extending, laterally facing, channel portion cooperating to form a nose piece and hold a shielding cassette, the eyewires being joined by an integral bridge portion optionally having an indented inner surface also adapted to receive a shielding cassette in locking relationship.

The invention further includes a pair of eyeglasses, as just described, in separable combination with a shielding cassette comprising, a top shield that rests on the top surface of the eyeglass frame when assembled, the cassette having two curved frame portions corresponding to the eyewires which are adapted to fit in the channels on the eyewires, the cassette optionally having a bridge portion adapted to fit in the indent on the browbar of the lens frame, the top shield having front and back depending portions forming a channel, said front having a section cut away over each lens, the bridge portion of the cassette having corresponding portions cut away, the cut away portions cooperatively acting as an air inlet, said depending back portions intercepting the air flow and directing it downwardly over the lens.

PRIOR LITERATURE

U.S. Pat. No. 3,160,735 (Aufricht) describes anti-fogging eyeglasses wherein the lens portion of the frame has an electrical wire surrounding each lens and connected to a battery in a temple. The browbar extends toward the wearer's face and is perforated to permit upward ventilation. This involves electrical heating, and does not direct air across the lens surface.

U.S. Pat. No. 4,670,914 (Harris) describes an eye protector comprising a lens structure having a rearwardly extending, circumambient wall member, the wall member having a plurality of ventilation apertures, each with a rearwardly directed cowl. This structure contemplates upward air flow from side or bottom apertures through top apertures.

U.S. Pat. No. 4,796,986 (Gowdy, Jr.) describes combination safety glasses that have channeled eyewire portions to receive an extra pair of correcting lenses in back of the safety lenses. Biased detents lock the lenses in place. There is no airflow provision, and the locking mechanism is not designed for a cassette.

A recently introduced commercial product, designated by the term BOLLE® CHRONOSHIELD, embodies a removable foam absorber system that attaches to a browbar, has air inlets and a foam pad to rest against a wearer's forehead. This product is depicted in the 1989-1990 catalog of Bolle America, Inc.

BRIEF DESCRIPTION OF THE DRAWINGS

In the accompanying drawings,

FIG. 1 is a front view of a separable eyeglass-frame and shielding cassette assembly in accordance with the invention.

FIG. 1a is a cross-sectional view taken along line 1a—1a of FIG. 1,

FIG. 2 is a top plan view of the assembly of FIG. 1,

FIG. 3 is a front view of the eyeglass frame of FIG. 1,

FIG. 4 is a top plan view of the eyeglass frame of FIG. 1,

FIG. 5 is a front view of the shielding cassette of FIG. 1,

FIG. 12 is a cross-sectional view taken along line 12—12 of FIG. 5,

DESCRIPTION OF THE INVENTION

Figure 6:
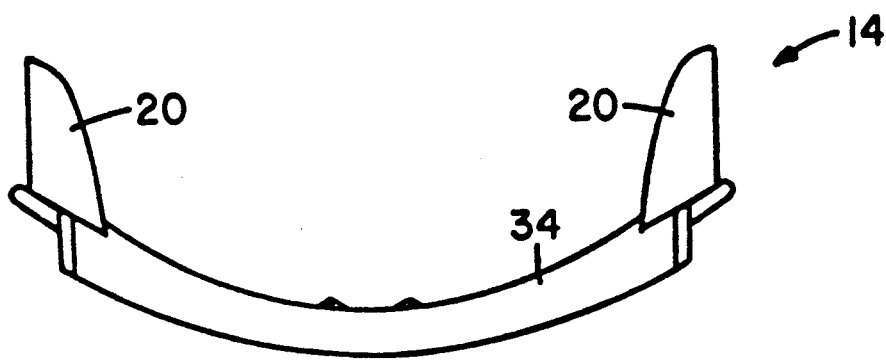
FIG. 6 is a top plan view of the shielding cassette of FIG. 1.

The venting system of the invention functions as an eyeglass accessory. It provides an air inlet for each lens in a pair of eyeglasses, and directs the incoming air over the interior surface of the lens. This minimizes fogging and/or frosting of the lens.

To accomplish its functions, the venting system may be built into a shielding cassette adapted to be separably locked into a pair of eyeglasses. Alternatively, it may be integrally, or separately, mounted on an eyeglass frame.

The preferred embodiment of our invention, as hereafter described, has the venting system so arranged as to direct airflow downwardly over an eyeglass lens or lenses. However, it will be obvious that the principle is also applicable if air inlets are provided on the sides or along the bottom of a pair of eyeglasses. The preferred embodiment described is considered both more effective and easier to provide.

FIG. 1 is a front view of an assembly, generally designated 10, comprising an eyeglass frame 12 and a shielding cassette 14. In the assembly 10, frame 12 and cassette 14 are separably interlocked together as hereafter illustrated.

FIG. 2 is a top plan view of assembly 10 showing frame 12 having attached thereto temples 16, as by screws 18. FIG. 2 also shows side shields 20 attached to cassette 14. Side shields 20 extend back to a wearer's head in known manner and may be of a flexible leather or plastic material. While optional, shields 20 are generally employed to avoid undesired wind currents and/or glare.

As shown in FIG. 1, and more clearly in FIGS. 3 and 4, eyeglass frame 12 is of conventional construction, comprising closed, curved eyewires 22, browbar 24, and bridge 26. It will be understood that the present invention is generally applicable to all eyewear, including the single, or continuous type lens used in some goggles and sports glasses. However, a major portion of eyewear does involve lefthand and righthand members, each being a mirror image of the other. Therefore, the invention is largely described in terms of this type, and reference to one member should be understood as reference to both, unless otherwise indicated.

The conventional construction of eyewires 22 may be modified by addition of channels 28 in the zones normally constituting the nosepad zones. The modified structure is shown in FIG. 1a, a view taken in cross-section along line 1a—1a of FIG. 1. FIG. 1a shows the normal eyewire structure 22 with V-shaped groove 30 adapted to receive a lens. Extending rearwardly is a thin wall 32 that turns outwardly at a right angle to form channel 28. The channel thus formed is adapted to snugly receive a corresponding section on shielding cassette 14 as subsequently described.

Figure 7:
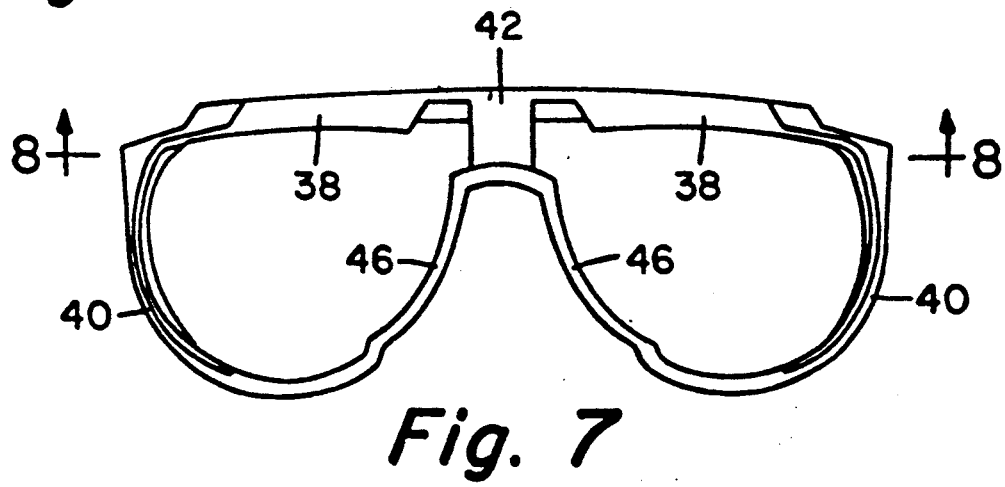
FIG. 7 is a back view of the shielding cassette of FIG. 1.
Figure 8:
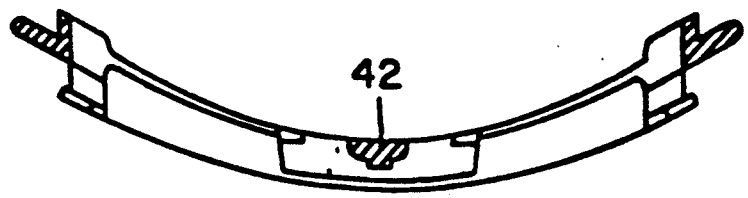
FIG. 8 is a cross-sectional view taken along line 8—8 of FIG. 7.

FIGS. 5, 6 and 7, respectively, provide front, top plan and back views of shielding cassette 14. Cassette 14 embodies the venting system which is a basic feature of the present invention. It has the further virtue of being assembled in interlocking arrangement with eyewear, but being easily disassembled. This permits using the eyewear in the usual manner when the shielding protection is not required.

Cassette 14 has a horizontal portion 34 in the nature of a strip or bar corresponding to a browbar. Extending downwardly from horizontal portion 34 are a front wall portion 36 and back wall portions 38. These wall portions form a channel-like structure adapted to fit over browbar 24 of frame 12. It may be noted that horizontal portion 34 extends rearwardly of browbar 24 to provide a shielding action against glare. This is also essential to the disposition of back wall portions 38 for venting purposes.

Figures 9, 10, 11:
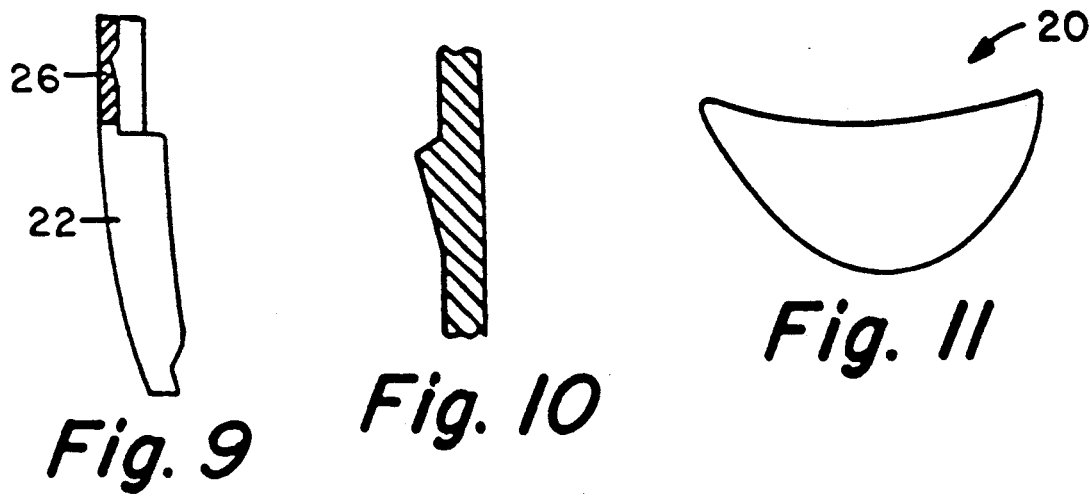
FIG. 9 is a cross-sectional view taken along line 9—9 of FIG. 3.
FIG. 10 is a cross-sectional view taken along line 10—10 of FIG. 5.
FIG. 11 is a side view of a side shield shown in FIG. 2.

Horizontal member 34 merges at either end 41 into a curved member 40 in the nature of an eyewire. At their inner end, members 40 merge into a central bridge member 42 which, as shown in FIG. 10 is of a design to interlock in a cavity 44 formed in browbar 24 as shown in FIG. 4.

As shown in FIGS. 5 and 7, curved members 40 may have their inner zones 46 indented slightly. These are the zones that fit into channels 28 on eyewires 22. However, this is a matter of convenience and design. From a functional standpoint, zones 46 may as well be a smooth continuation of curved member 40.

Front wall 36, as well as horizontal member 34, are cut away for a distance above each curved member 40 to leave a top wall 48 and back wall 38. Walls 48 and 38 form boundaries for cavities 50 which provide for air inflow. Likewise, back walls 38 intercept such airflow and direct it downwardly over the inner surface of lenses mounted in eyewires 22. Together the cavities 50 and back walls 38 constitute the venting system of our invention.

Figure 13:
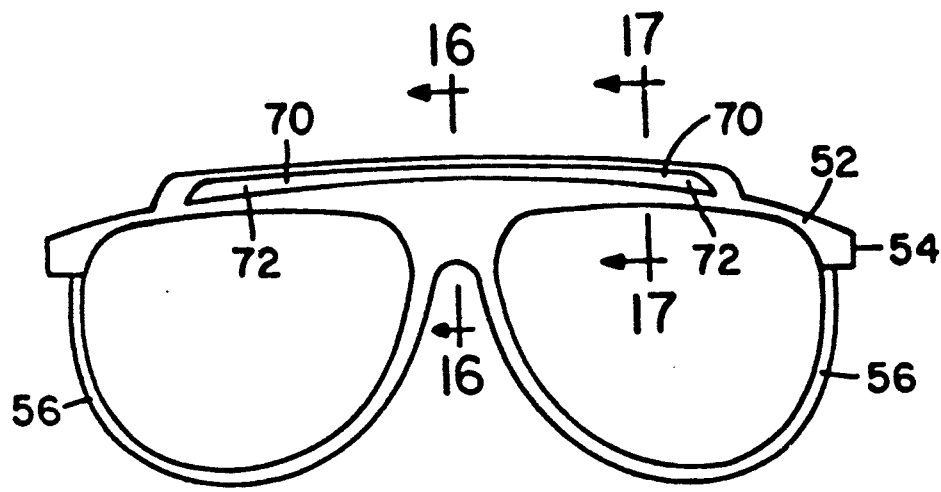
FIG. 13 is a front view of an alternative form of the invention.
Figure 14:
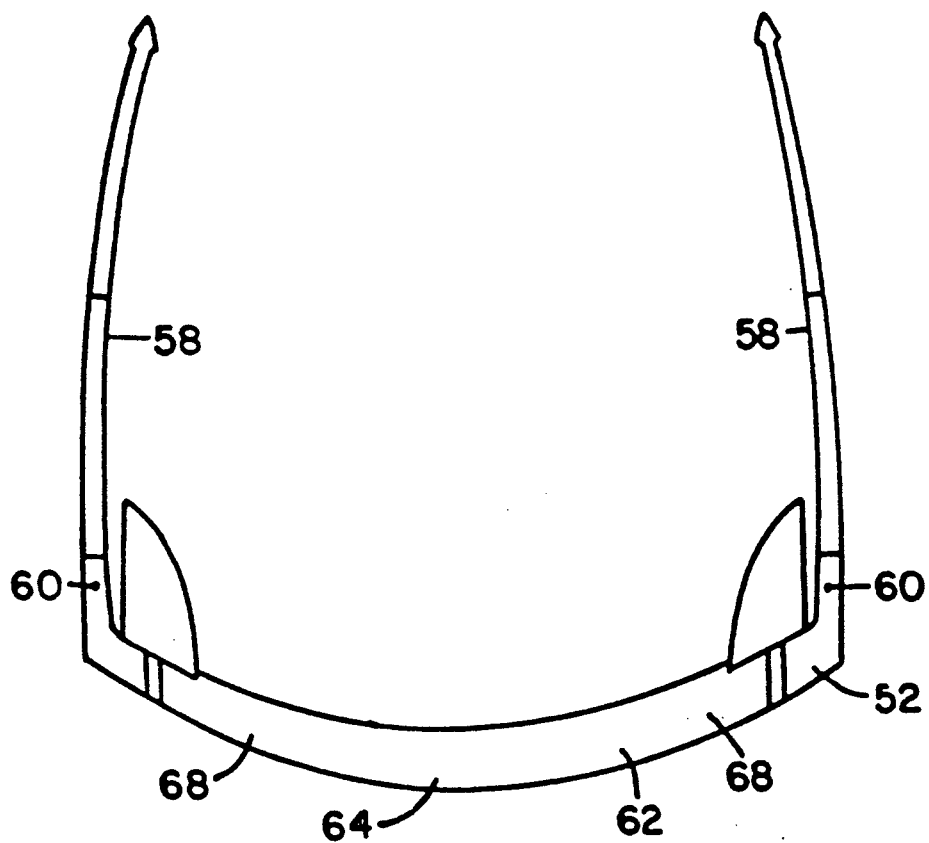
FIG. 14 is a top plan view of the alternative form of FIG. 13.
Figure 16:
FIG. 16 is a cross-sectional view taken along line 16—16 of FIG. 13.
Figure 15:
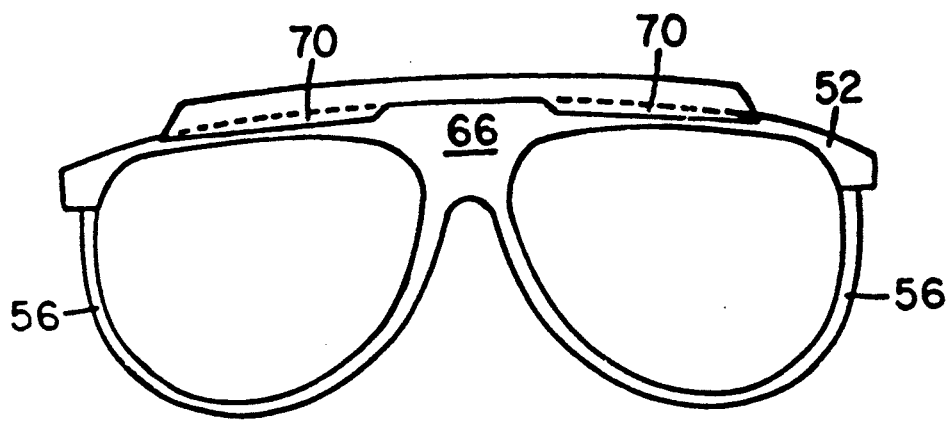
FIG. 15 is a back view of the alternative form of FIG. 13.
Figure 17:
FIG. 17 is a cross-sectional view taken along line 17—17 of FIG. 13.

FIGS. 13, 14 and 15 are, respectively, front, top plan and back views of an alternative form of the invention. In this form, the venting system is associated directly with a pair of eyeglasses, and is not part of a shielding cassette. Eyeglass frame 52 may correspond to eyeglass frame 12 of FIGS. 3 and 4, except that channel members 32 are omitted. Thus, frame 52 will consist of a browbar 54 and integrally formed eyewires 56. As shown in FIG. 14, frame 52 may be attached to temples 58 by screws 60, or other suitable means of attachment.

The venting system is generally similar in appearance and function to that shown as cassette 14. However, curved members 40 and bridge 42 are removed. Thus, it will comprise a horizontal bar or strip portion 62 having a central portion 64 and side portions 68 having depending back walls 70. Central portion 64 is a solid portion adapted to rest on, and support the system on the top of browbar 54. Each side portion 68 is partially cut away on its underside to form horizontal cavities 72 which extend to back walls 70.

In operation then, cavities 72 provide an air vent or inlet above each lens inserted in eyewires 56. Back walls 70 intercept the incoming air flows and direct them down over the inside surface of the lenses.

The venting system will rest on browbar 54. It may be molded integral therewith, or sealed to provide a permanent union. Alternatively, it may be temporarily attached, and thus removable. In the latter case, a central portion of back wall 70 may be inset to cooperatively form a channel with front wall 66 that fits snugly over browbar 54.

Figure 18:
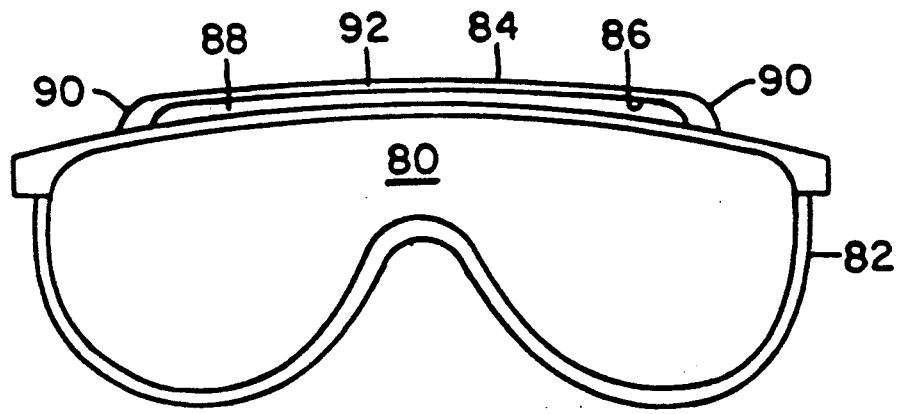
FIG. 18 is a front view of another alternative form of the invention.

FIG. 18 is a front view of another alternative form of the invention. This embodiment involves a single or continuous lens member 80. Lens member 80 may be held within a frame 82 that may be in the nature of a continuous eyewire as shown. Alternatively, frame 82 may only partially encompass single lens 80.

Frame 82 supports a venting system 84 that is functionally similar to those previously described. However, system 84 has a single cavity 86 and backwall 88. The latter extends between ends 90 of bar member 92. Thus, air flow enters across the entire cavity and is directed downwardly over the inner face of lens 80.

We claim:

1. A venting system for use with eyewear having a frame, the venting system comprising a bar member supported by the frame and extending rearwardly of the frame when mounted thereon, the bar member having an underside adjacent the outer edge of the frame, the underside being partially cut away to form top wall and back wall portions, the top wall forming a horizontal cavity between the frame and the top wall providing an air vent extending to each back wall the back wall being spaced rearwardly from the frame to direct air flowing through the horizontal cavity down over the lens.

2. A venting system in accordance with claim 1 that is mounted atop the browbar in a frame of a pair of eyeglasses.

3. A venting system in accordance with claim 2 wherein the system is permanently mounted.

4. A venting system in accordance with claim 2 wherein the system is separably mounted.

5. A venting system in accordance with claim 1 that is incorporated in a shielding cassette.

6. A venting system in accordance with claim 1 comprising a horizontal bar member adapted to support the system on the browbar of the eyewear and having a central portion and two side portions extending beyond the central portion, each side portion being partially cut away to form a horizontal cavity extending to a back wall whereby each cavity provides an air vent above an associated lens in the eyewear and the back wall cooperates with each air vent to direct air flow downwardly over the lens.

7. A shielding cassette adapted to use with a pair of eyeglasses comprising a bar member in the nature of an eyeglass frame from which depends at least one rear wall, the bar having an underside adapted to face an outer surface on an eyeframe and to rest thereon, the underside of the bar having at least one portion partially cut away to form a horizontal cavity extending from the front surface to the depending back wall and cooperating with an eyeframe to provide a horizontal air vent to the back wall which intercepts air flow coming in through said horizontal air vent and directs it down over a lens in the eyeglasses.

8. A shielding cassette in accordance with claim 7 wherein the bar member is a horizontal top shield from which two rear wall portions depend, and from which two closed, curved members in the nature of eyewires integrally depend, the bar member having two cut away sections extending to, and cooperatively acting with, the rear wall portions to direct air flow downwardly over lenses in the eyeglasses.

9. A shielding cassette in accordance with claim 8 wherein the closed, curved members have indented zones adapted to lock into channels on the eyewires of a pair of glasses.

10. A shielding cassette in accordance with claim 8 having side shields affixed thereto.

11. A shielding cassette in accordance with claim 8 wherein the horizontal bar also has a depending front wall extending between the two cut away air inlets and forming a channel with the back wall.

12. A shielding cassette in accordance with claim 8 wherein the closed, curved members merge into a central bridge member that is designed to lock into a cavity on a pair of eyeglasses.

13. In separable combination, a pair of eyeglasses and a shielding cassette, the eyeglasses having a frame adapted to receive and hold the cassette, the cassette comprising a bar member in the nature of an eyeglass frame from which depends at least one rear wall, the bar having an underside adapted to face an outer surface on an eyeframe and to rest thereon, the underside of the bar having at least one portion partially cut away to form a horizontal cavity extending from the front surface to the depending back wall and cooperating with an eyeframe to provide a horizontal air vent to the back wall which intercepts air flow coming in through said horizontal air vent and directs it down over a lens in the eyeglasses.

14. A separable combination in accordance with claim 13 wherein the eyeglass frame comprises two eyewires, each having a channel portion cooperating to form a nose piece and adapted to receive and hold the shielding cassette, the eyewires being joined by an integral bridge portion, the shielding cassette comprising a top shield with a central portion that rests on the top surface of the frame when assembled, the cassette having two curved frame portions corresponding to the eyewires which are adapted to fit in the channels on the eyewires, the top shield having a section cut away over each lens, the cut away portions cooperatively acting as an air inlet, said depending back portion intercepting the air flow and directing it downwardly over the lens.

15. A combination in accordance with claim 14 wherein the integral bridge portion on the eyeglass frame has an indented inner surface adapted to receive the shielding cassette in locking relationship, and the cassette has a bridge portion adapted to fit in the indented inner surface on the eyeglass frame.

16. A combination in accordance with claim 14 wherein the channel portion on each eyewire of the frame is an inwardly extending, laterally facing extension of a section of the eyewire.

17. A combination in accordance with claim 14 wherein the top shield on the cassette has front and back walls depending from the central portion thereof intermediate the cut away portions.

18. A combination in accordance with claim 14 wherein the cassette has side shields attached thereto.

19. A pair of sunglasses having a frame comprising two eyewires, each wire having a thin wall that extends rearwardly from an outer portion of the eyewire and turns inwardly of the eyewire to form a channel adapted to hold a shielding cassette, the eyewires being joined by an integral bridge portion having an indented inner surface also adapted to receive a shielding cassette in locking relationship.

* * * * *